United States Patent [19]

Danner

[11] Patent Number: 5,130,358

[45] Date of Patent: * Jul. 14, 1992

[54] COMPOSITIONS USEFUL AS FLOCCULATING AGENTS COMPRISING A HYDROPHILIC CATIONIC POLYMER AND AN ANIONIC SURFACTANT

[75] Inventor: Bernard Danner, Riedisheim, France

[73] Assignee: Sandoz Ltd., Basel, Switzerland

[*] Notice: The portion of the term of this patent subsequent to Sep. 29, 2004 has been disclaimed.

[21] Appl. No.: 326,947

[22] Filed: Mar. 22, 1989

Related U.S. Application Data

[63] Continuation of Ser. No. 886,580, Jul. 16, 1986, abandoned, which is a continuation of Ser. No. 721,404, Apr. 9, 1985, abandoned, which is a continuation of Ser. No. 462,814, Feb. 1, 1983, abandoned.

[51] Int. Cl.$^5$ ................................................ C08K 5/52
[52] U.S. Cl. ............................. 524/140; 524/145; 524/156; 524/157; 524/158; 524/166; 524/284; 524/312; 524/313; 524/366; 524/376; 524/475; 524/808; 524/812; 524/815
[58] Field of Search ............... 524/140, 145, 156, 157, 524/158, 166, 284, 312, 230, 366, 376, 475, 808, 815, 812

[56] References Cited

U.S. PATENT DOCUMENTS

| | | | |
|---|---|---|---|
| 4,077,930 | 3/1978 | Lim et al. | 524/801 |
| 4,217,262 | 8/1980 | Coscia et al. | 524/801 |
| 4,299,755 | 11/1981 | Keggenhoff et al. | 260/23 AR |
| 4,440,744 | 4/1984 | Strasilla et al. | 526/220 |
| 4,696,962 | 9/1987 | Danner et al. | 524/812 |

Primary Examiner—Joseph L. Schofer
Assistant Examiner—J. M. Reddick
Attorney, Agent, or Firm—Gerald D. Sharkin; Richard E. Vila; Thomas C. Doyle

[57] ABSTRACT

A cationic polymer composition suitable for use as a flocculating agent and as a retention aid in paper making consists of a mixture of
a) a hydrophilic cationic polymer,
b) an anionic surfactant,
optionally c) a water-immeriscible oil in which the polymer a) is insoluble,
and, if c) is present,
optionally d) a lipophilic non-ionic surfactant,
optionally e) water
and optionally f) an oil-miscible polar solvent.

The compositions may be prepared by water-in-oil emulsion polymerisation and are readily diluted with water.

53 Claims, 1 Drawing Sheet

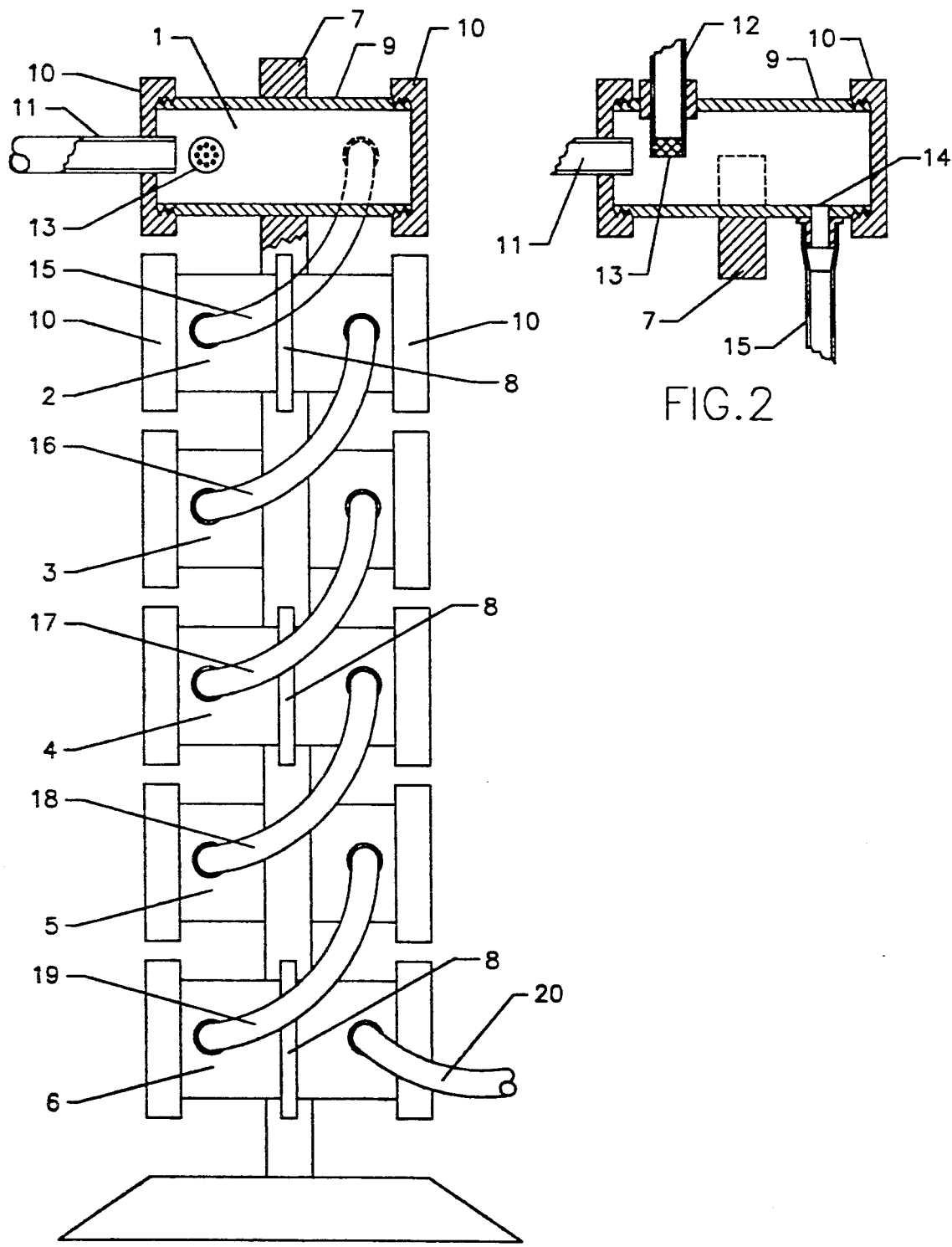

COMPOSITIONS USEFUL AS FLOCCULATING AGENTS COMPRISING A HYDROPHILIC CATIONIC POLYMER AND AN ANIONIC SURFACTANT

This is a continuation application Ser. No. 06/886,580, filed Jul. 16, 1986, now abandoned, which in turn is a continuation of application Ser. No. 06/721,404, filed Apr. 9, 1985, now abandoned, which in turn is a continuation of application Ser. No. 06/462,814, filed Feb. 1, 1983, now abandoned.

This invention relates to hydrophilic cationic polymers useful for example as flocculating agents. For such uses, it is important that compositions containing the polymer can be rapidly dispersed or dissolved in water.

It has now been found that compositions containing an excess of a hydrophilic cationic polymer together with an anionic surfactant, which optionally forms a salt with the cationic polymer, can easily be dispersed or dissolved in water.

Accordingly, the present invention provides a water-miscible composition comprising
a) a hydrophilic cationic polymer and
b) an anionic surfactant, the molar quantity of b) being not greater than the molar quantity of the cationic monomer units of a).

The polymer a) is free of anionic monomer components, and is composed either entirely of cationic monomer units or of both cationic and non-ionic monomer units. By the term cationic is meant that the monomer unit includes a group which either carries a positive charge or which has basic properties and can be protonated under mild acid conditions. Preferably such groups are amino or quaternary ammonium groups. Suitable polymers a) include cationic addition and condensation polymers such as polyamideamines, polyethyleneimines and polyetheramines, as described for example in U.S. Pat. Nos. 3,210,308, 3,275,588, 3,329,657, 3,632,559, 3,753,931 and 4,056,510. Preferably however polymer a) is at least partly composed of vinyl addition polymers of cationic and optionally non-ionic vinyl monomers. Preferably polymer a) comprises at least 70% by weight of such vinyl addition polymers, more preferably at least 90%; especially preferred polymers a) consist entirely of such vinyl addition polymers.

Preferred vinylic monomers are water-soluble monomers based upon esters and amides of acrylic and methacrylic acid, vinylpyridines, diallylamines, N-vinylpyrrolidones and vinyl ethers. Of the cationic monomers, preferred types include the dialkylaminoalkyl and dialkylaminohydroxyalkyl esters of acrylic and methacrylic acid, and the corresponding trialkylammonium compounds; dialkylaminoalkyl amides of acrylic and methacrylic acid, and the corresponding trialkylammonium compounds; dialkysulphoniumalkyl esters of acrylic and methacrylic acid; 2- and 4-vinylpyridine and the corresponding N-alkylpyridinium derivatives; and N-alkyl diallylamines and the corresponding N,N-dialkyldiallylammonium derivatives. In these compounds, the alkylene group forming the bridge between the N and O, O and S or N and N atoms preferably contains 2 to 4, more preferably 2 to 3 carbon atoms, and the alkyl groups on nitrogen or sulphur contain preferably 1 to 4, more preferably 1 or 2 carbon atoms and may be unsubstituted or substituted by phenyl. Phenyl-substituted alkyl is preferably benzyl; more preferably, however, the alkyl groups are unsubstituted.

More preferred cationic monomers are those of formulae I–VIII

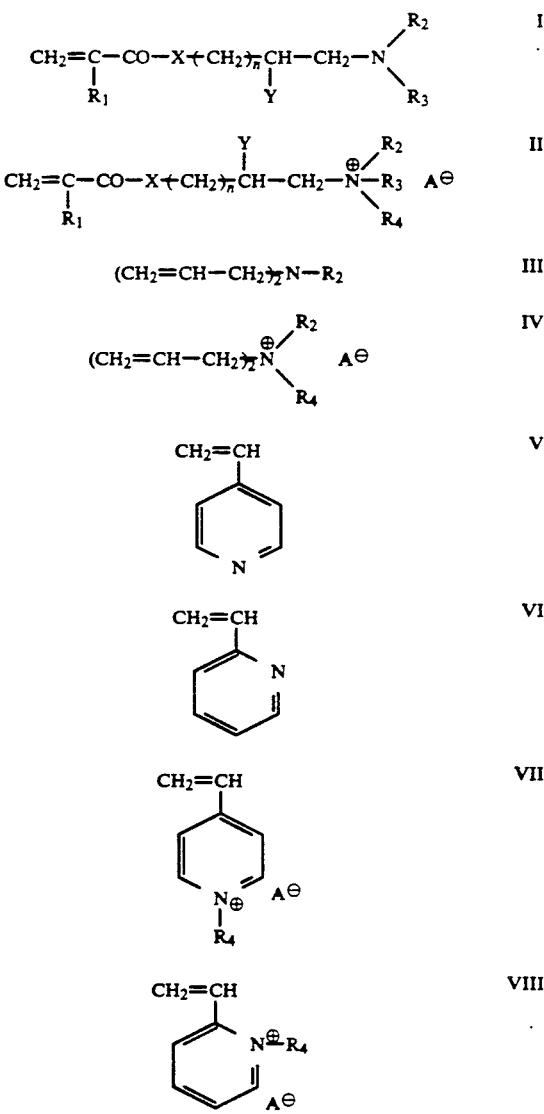

In the above formulae,
$R_1$ is H or methyl
$R_2$ is methyl or ethyl
$R_3$ is methyl or ethyl
$R_4$ is hydrogen, methyl or ethyl
X is —O— or —NH—
Y is H or —OH when X is —O— and H when X is —NH—
n is 0 or 1, provided that when Y is —OH, n=1 and $A^\ominus$ is an anion.

Preferably $R_2$, $R_3$ and $R_4$ are all methyl. $A^\ominus$ may be any conventional anion, preferably a halide ion (particularly $Cl^\ominus$, $Br^\ominus$ or $I^\ominus$) or an $R_4SO_4^\ominus$ anion. In a preferred form of the invention, however, $A^\ominus$ is $A_1^\ominus$ where $A_1^\ominus$ is the anion of the anionic surfactant b).

Particularly preferred cationic monomers are those of formulae I and II, especially those in which Y is hydrogen and particularly those in which Y is hydrogen and X is —O—.

Preferred non-ionic monomers are acrylamide, methacrylamide, N-vinylpyrrolidone, methyl vinyl ether, ethyl vinyl ether and compounds of formula IX

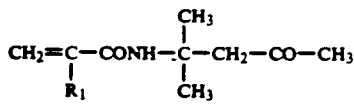

IX where $R_1$ is as defined above.

Of these, acrylamide and methacrylamide, particularly acrylamide, are preferred.

Preferred cationic polymers a) are copolymers of cationic monomers of formula I or II (Y=H, X=—O—) with methacrylamide and/or acrylamide. In the cationic polymers a), the molar quantity of cationic monomer units is preferably at least 5% of the total, more preferably 10-80 mol %, particularly 10-40 mol %. It may be advantageous, however, to employ a mixture of two cationic polymers of differing cationic content, for example a weakly cationic polymer of e.g. 5-20 mol % cationic units and a strongly cationic polymer of e.g. 20-80 mol %, preferably 30-60 mol % cationic units. Any desired cationic content within a defined range may then be obtained by mixing the two polymers in various proportions.

The molecular weight (weight average MW) of the polymer is preferably >100,000, more preferably >500,000, particularly >1,000,000. The MW may be as high as desired, for example up to 20,000,000.

The preferred polymers may be structurally defined as random copolymers containing units of the following three types.

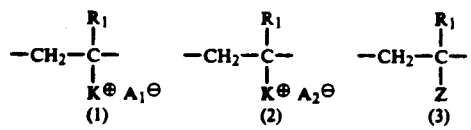

in which $R_1$ is as defined above, $K^\oplus$ is a cationic residue preferably derived from a monomer of formula II, IV, VII or VIII, $A_1^\ominus$ is the anion of the surfactant b), $A_2^\ominus$ is a non-surfactant anion such as halide or $R_4O\text{-}SO_3^\ominus$ and Z is a non-ionic residue, preferably of formula —CONH$_2$, —OCH$_3$, —OC$_2$H$_5$ or —CONHC(CH$_3$)$_2$CH$_2$COCH$_3$.

If $\alpha$, $\beta$ and $\gamma$ represent the molar proportions of units (1) (2) and (3) respectively, so that $\alpha+\beta+\gamma=100$, $(\alpha+\beta)$ is preferably $\geq 5$, more preferably 10-80, particularly 10-40 and $\alpha$ is preferably $\leq 15$, more preferably $\leq 10$.

The anionic surfactant b) may be any conventional surfactant having at least one lipophilic hydrocarbon residue and at least one hydrophilic anionic group. Suitable surfactants are described for example in "Surfactant Science Series" (M. Dekker Inc., New York and Basle), vol. 7; and "Anionic Surfactants" (ed. W. M. Linfield, 1976), parts 1 and 2. The lipophilic residue is preferably araliphatic or aliphatic and contains at least 9 carbon atoms, preferably 12-36 carbon atoms. The anionic group may be any conventional acid group, optionally in salt form, for example carboxylate, phosphate, phosphonate, sulphate and sulphonate, of which sulphonate is most preferred and phosphonate least preferred. The molecule may contain polyalkylene glycol ether groups, but these are preferably absent.

Preferred classes of anionic surfactants are: sulphated fatty acid mono- di- and triglycerides, particularly sulphated natural fats or oils and sulphated monoglycerides; sulphated fatty alcohols; sulphated fatty acid alkanolamides; sulphonated hydrocarbons, particularly alkylsulphonates, olefin sulphonates and alkarylsulphonates, especially petroleum sulphonates; sulphonated aliphatic carboxylic acids and esters, particularly $\alpha$-sulphomonocarboxylic acids and esters and alkyl sulphosuccinates; partial alkyl esters of phosphoric acid; aliphatic carboxylic acids (soaps); and carboxymethylation products of fatty alcohols, monoglycerides and fatty acid alkanolamides. Of the above, the sulphonates, particularly petroleum sulphonates, are preferred.

It is preferred that the anionic surfactant is originally present at least partially in the form of a salt with a conventional cation, for example that of an alkali metal, alkaline earth metal, ammonium or substituted ammonium, $Zn^{2+}$, $Al^{3+}$ and $Zr^{4+}$. Preferably it is in the form of a salt of a polyvalent inorganic cation, of which $Ca^{2+}$ is particularly preferred. In the compositions of the inventions, however, after polymer a) is mixed with surfactant b), the cation of the anionic surfactant may be wholly or partially replaced by cationic units of the polymer. Salts of the surfactant with a polyvalent metal may be prepared in situ by treating the sodium salt of the surfactant with a water-soluble salt of the metal, for example the formate or chloride. In the case of calcium, calcium chloride is preferred.

The anionic surfactant may have a greater or lesser degree of water solubility or dispersability. Preferred anionic surfactants are lipophilic, and preferably are such that their sodium salts are oil-soluble. Especially preferred are those which in salt form (particularly the calcium salts) give no true solution in water, but act as W/O (water-in-oil) emulsifiers, particularly with the oils defined below under c).

The compositions of the invention preferably contain, in addition to a) and b), c) a water-immiscible oil in which the polymer a) is insoluble.

When component c) is present, polymer a) is finely dispersed in the oil c).

Component c) may be a single oil or a mixture of oils, and may be either natural or synthetic. Suitable oils include oils from refining crude petroleum, vegetable and animal oils, synthetic hydrocarbons, modified paraffins and fatty acid esters. Examples of these types include the following:

1. Hydrocarbons
   1.1. Hydrocarbons from petroleum refining, particularly
      1.1.1. petroleum spirit, b.p. 65°-140° C. (de-aromatised or aromatic-containing)
      1.1.2. white spirits, paint thinners etc., b.p. 100°-310° C., preferably 140°-300° C. especially those in Table I

TABLE I

| % aromatic content | b.p. °C. |
| --- | --- |
| aromatic-free | 100-270 |
| 12-19 | 160-210 |
| 24-45 | 140-310 |
| 80-90 | 160-260 |
| fully aromatic | 160-310 |

1.1.3. Isoparaffins, b.p. 110°-260° C.
   1.1.4. Paraffin oils (=mineral oils, e.g. diesel oil, spindle oil, machine oil, cylinder oil, lubricating oil, medicinal paraffin oil)
   1.1.5. petrolatum (preferably mixed with an oil liquid at 20° C.)

1.2. Synthetic hydrocarbons, particularly from Fischer-Tropsch synthesis or high pressure hydrogenation of carbon, e.g.

| synthetic petrol (gasoline) | b.p. | 65–170° C. |
|---|---|---|
| Kogasin I | b.p. | 190–230° C. |
| Kogasin II | b.p. | 230–330° C. |
| synthetic paraffin oil | b.p. | 300–450° C. |

1.3. Benzenes and alkylbenzenes e.g. toluene, xylene, and methyl-ethyl-, trimethyl-, dimethylethyl-, tetramethyl- and higher ($C_{6-12}$)alkyl benzenes.

2. Natural vegetable or animal triglycerides, particularly olive oil, peanut oil, cottonseed oil, coconut fat, rape oil, sunflower oil, corn oil, castor oil and neats foot oil.

3. Fatty acid monoesters, primarily $C_{1-4}$alkyl esters of $C_{12-24}$, preferably $C_{14-24}$ fatty acids, particularly methyl, butyl and isopropyl esters of stearic, oleic, palmitic and myristic acids and mixtures thereof.

Preferred oils are low-aromatic hydrocarbons and aliphatic fatty acid esters, particularly hydrocarbons listed under 1.1.2., 1.1.3. and 1.1.4. above, especially aromatic-free and low-aromatic white spirits, isoparaffin and paraffin oils.

In one particular embodiment of the invention component c) comprises a mixture of at least two oils, particularly of a mixture of an oil $c_1$) and an oil $c_2$) chosen such that the oil/water required hydrophile/lipophile balance (O/W-RHLB) value of $c_1$) is greater than that of the mixture of $c_1$) and $c_2$). The O/W-RHLB value of an oil is the optimum HLB-value of a hypothetical surfactant which is sufficient to produce stable O/W emulsion of that oil and water; see for example "Cosmetics, Science and Technology" Wiley, 2nd edition, volume 3, 1974, pp 602–7, or "Emulsion Science" P. Sherman, Academic Press, 1968 pp 146–7 or "Emulsion, Theory and Practice" P. Becher, Amer. Chem. Soc. Monograph Series No. 162, 2nd edition, 1965.

Preferably the O/W-RHLB value of $c_2$) is less than that of $c_1$). Preferred oils $c_1$) have O/W-RHLB values in the range 10–15; such oils include hydrocarbon oils listed under 1.1.1., 1.1.2., 1.1.3. and 1.3. above. Preferred oils $c_2$) have O/W-RHLB values in the range 7–10; such oils include those listed under 1.1.4., 1.1.5. 2. and 3. above.

Preferably the compositions according to the invention contain, in addition to a), b) and c), d) a lipophilic non-ionic surfactant.

Component d) is preferably oil-soluble and may be a single surfactant or a mixture. Component d) must function as a W/O (water-in-oil) emulsifier, that is, it must be capable of forming a W/O emulsion with at least part of the oil c) in the presence of water. The surfactant d) is preferably insoluble in water, and has an HLB value $\leq 8$, more preferably in the range 3–8, particularly in the range 4–7. If d) is a mixture, these values apply to the average HLB value of the mixture.

Component d) generally is one or more compounds having at least one lipophilic hydrocarbon residue of at least 9, preferably 9–24 carbon atoms and at least one non-ionic hydrophilic residue, which is preferably a mono- or polyethylene glycol group, optionally containing propylene glycol units, or the residue of a polyol e.g. glycerol, mannitol and sorbitol. Other suitable types include hydrophobic Pluronics and Tetronics in which the high propylene oxide content can be regarded as the lipophilic residue.

Specific types of non-ionic surfactants include: Products obtainable by addition of ethylene oxide (EO) and-/or propylene oxide (PO) (preferably EO alone) to aliphatic alcohols, alkyl phenols, fatty acids, fatty acid alkanolamides, partial fatty acid esters of polyols, and vegetable or animal fats or oils; partial fatty acid esters of polyols; EO/PO copolymers with high PO content (Pluronic type); EO/PO addition products to ethylene diamine, having a high PO content (Tetronic type); diethers of mono- or polyethylene glycols with aliphatic alchols and alkyl phenols; and diesters of mono- or polyethylene glycols with aliphatic fatty acids.

The preferred number of ethylene oxide units in addition products of EO to fatty alcohols and alkyl phenols is 1–6 and in addition products to fatty acids and in di-esters of polyalkylene glycol, the number of EO units is preferably 1–10. These numbers are average values and need not be integral.

Fatty acid residues may be saturated or unsaturated (if unsaturated, preferably monoethylenically unsaturated) and are preferably acyl groups having 9–24, preferably 12–20, carbon atoms, particularly residues of lauric, myristic, stearic and oleic acids. If an alkyl group is the sole lipophilic group, it has preferably 9–24, more preferably 9–18, carbon atoms and may be straight chain or branched. In alkylaryl groups the alkyl group preferably has 4–12 carbon atoms and may also be straight or branched.

Particularly preferred surfactants are those of formula X-XIII

   X

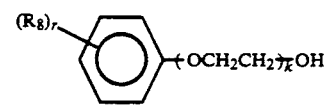   XI

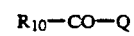   XII

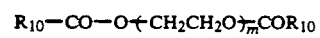   XIII in which
$R_8$ is $C_{4-12}$ alkyl
$R_9$ is $C_{9-18}$alkyl or alkenyl
$R_{10}CO$ is the acyl residue of an aliphatic $C_{12-18}$ fatty acid
Q is the monovalent residue of sorbitol, glycerol, or di- to tetra-ethylene glycol
t is 2–3
r is 1 or 2
k is 3–5 and
m is 4–9.

The HBL values of non-ionic surfactants may be calculated by use of a standard formula. In order to function as a W/O emulsifier in this system, the calculated HLB value must be greater than 2.5.

When the oil c) is a mixture of oils $c_1$) and $c_2$) then the oil mixture and the surfactant d) are preferably so chosen that the O/W-RHLB value of the oil mixture is as close as possible to the HLB value of d), or at least is not less than this value.

Preferably the compositions according to the invention contain, in addition to components a), b), c) and preferably d), e) water.

The polymer a) and salts of the polymer with surfactant b) are hydrophilic and will take up water or form with water a gel or sol and in sufficient water will form a true or a colloidal solution. The quantity of water e) is chosen so that the polymer together with the water becomes finely dispersed in the oil. The dispersion may be in the form of a suspension of wet or water-swollen polymer or of an aqueous polymer gel in the oil, or an emulsion of an aqueous polymer sol or polymer solution in the oil.

In one particular aspect of the invention, the composition contains, in addition to components a)–c) preferably d) and optionally e) f) an oil-miscible polar solvent which is only slightly soluble in water, not self-dispersing in water, and which has no emulsifying properties of its own, but which reduces the water/oil interfacial surface tension.

Suitable solvents f) are compounds which have extremely low HLB values but whose molecules are polar enough to orientate themselves at the oil/water interface. Preferred solvents are $C_{5-10}$ aliphatic alcohols, phosphoric acid triesters or Pluronics. Examples of suitable solvents include methyl isobutyl carbinol, 2-ethyl-hexanol, isononanol, isodecanol, 2,4,7,9-tetramethyl-5-decyn-4,7-diol, tributyl phosphate, tri-isobutyl phosphate, tri(butoxy-ethyl) phosphate and Pluronic L101. The presence of f) is desirable when little or no water e) is present.

Compositions according to the invention may be prepared by mixing surfactant b) before, during or after the polymerisation, with the polymer a) or the corresponding monomers, the polymer or monomers being present in finely divided form. When a) is other than a vinyl addition polymer it is preferred to add the surfactant to the already formed polymer. The polymer should be in finely-divided form for example as an aqueous solution, a dispersion in oil, or, preferably, as a W/O emulsion of an aqueous solution of the polymer in oil. When polymer a) is a vinyl addition polymer, it is advantageous to carry out the polymerisation in a W/O emulsion system and to have at least part of the anionic surfactant b) present before polymerisation, or at least before addition of the cationic monomer. After polymerisation water and/or oil can if desired be removed by distillation, and optionally further additions of any of components a)–f) may be made.

Preferably the vinyl monomers are emulsified in the form of their aqueous solution in at least part of the oil c) in the presence of the anionic surfactant b) and preferably also in the presence of the lipophilic non-ionic surfactant d). This W/O emulsion may be formed by adding the vinyl monomers to an already-formed W/O emulsion, or the monomers may be added to an aqueous solution or dispersion of the anionic surfactant b), to which is then added the oil and optionally the non-ionic surfactant d), and polymerisation is initiated by addition of a suitable catalyst.

The presence of the anionic surfactant in the monomer-containing W/O emulsion before polymerisation enables part of the cationic monomers, particularly in neutral to acid conditions, to form salts with the surfactants, which salts are less water-soluble and more lipophilic than the monomers themselves. These monomer-surfactant salts are novel and form part of the present invention. Preferred salts have the formula XIV

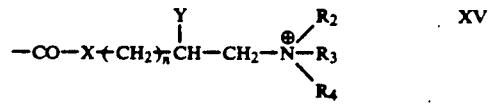

where $R_1$, $K^\oplus$ and $A^\ominus$ are as defined above.
Preferably $K^\oplus$ is of formula XV $$-CO-X+CH_2)_n CH-CH_2-\overset{\oplus}{N}\begin{matrix}R_2\\R_3\\R_4\end{matrix} \quad XV$$

with Y above CH where
X, n, Y, $R_2$, $R_3$ and $R_4$ are defined above, and Y is preferably H, and
$A_1^\ominus$ is the anion of a hydrocarbon sulphonate, particularly petroleum sulphonate.

An alternative method of preparing compositions according to the present invention consists in forming a dispersion containing polymer a), water e) and lipophilic non-ionic surfactant d) in oil c) in the absence of anionic surfactant b), and then adding the anionic surfactant b) to this dispersion. For this process variant, it is preferred that the anionic surfactant is an oil-soluble, practically water-insoluble sulphonated hydrocarbon, and that the oil is a hydrocarbon oil of the type listed under 1.1. above, particularly white spirit. Preferably the dispersion is obtained by emulsion polymerisation of the monomer solution in oil in the presence of surfactant d) as emulsifier, and optionally partial removal of water by distillation.

The emulsion polymerisation, preferably in the presence of anionic surfactant b) may be carried out in conventional manner (see for example "High Polymers" vol. 9, 1955—"Emulsion Polymerisation, Interscience Publishers, N.Y.) Conventional free radical initiators are used to catalyse the polymerisation. Suitable initiator systems include peroxide compounds, e.g. t-butyl hydroperoxide, in combination with redox systems, e.g. ferric salts plus sodium thiosulphate. To sequester impurities, it is preferred to add a complexing agent such as salts of ethylenediaminetetraacetic acid (EDTA). The aqueous phase may contain further additives; e.g. acids, bases or buffer systems to regulate pH and salts e.g. sodium sulphate and calcium chloride.

The air above the emulsion is normally replaced by an inert gas and polymerisation is started by the addition of initiator. The polymerisation takes place for example at pH values between 2 and 8, preferably under acid conditions (pH 2.5-5, preferably 3-4). The water content of the W/O emulsion during polymerisation is preferably 15-80 wt. %, more preferably 30-65 wt. % based on the total weight of the emulsion.

The polymerisation is normally exothermic, and may be carried out under adiabatic or isothermal conditions, but preferably is carried out partially adiabatically, i.e. the temperature is allowed to increase within certain limits, e.g. up to 120° C., under pressure if necessary. Preferred reaction temperatures are from 30°-110° C. If the reaction mixture contains hydrolysable monomers, e.g. esters or primary amides, it is necessary to avoid reaction conditions under which significant amounts of hydrolysis would occur.

For the W/O emulsion polymerisation it is advantageous to use an oil c) comprising at least 50%, preferably at least 80% by wt. hydrocarbons, which should preferably be as completely aliphatic as possible. The concentration of monomers in the emulsion is not critical, but for economic reasons it is advantageous to work with as high concentrations as is practicable. The concentration of surfactant used is adjusted to be sufficient to give a stable W/O emulsion under the polymerisation conditions.

After polymerisation is complete the polymer-containing W/O emulsion can be treated by addition of further quantities of components a)-f) or, if desired, the amount of components c) and/or e) can be reduced by distillation. By such adjustments properties of the emulsion such as stability and ease of dilution with water can be influenced and improved. If in addition to vinyl addition polymer other cationic polymers a) are to be present, these are preferably added after the emulsion polymerisation is complete.

If component f) is to be present, this is preferably added after the emulsion polymerisation, more preferably after all other components have been added. It may be advantageous to mix f) with a little oil c) before addition.

If a mixture of oils $c_1$) and $c_2$) is to be used, the polymerisation is preferably carried out either in the mixture or in $c_1$) alone or in a mixture of $c_1$) with less than all of the $c_2$). The oil $c_2$), or that part of it not already present, may be added after the emulsion polymerisation, optionally after some or all of the water has been distilled off.

The relative weights of the various components in the compositions according to the invention may be represented as follows: for every 100 parts by weight of the polymer a), the composition contains x parts by weight of b), y of c), z of d) u of e) and v of f). The figures 100 for a) and x for b) do not take into account the salt formation between a) and b); that is, the weight of surfactant which forms a salt with the polymer is not counted as part of the polymer weight, but remains part of weight x.

The preferred ranges of x-v are set out in Table II below, the values for each component being independent of each other except where otherwise stated. For certain applications, the value of x may be as low as 0.5.

TABLE II

| component | value of | (component a = 100) | | |
|---|---|---|---|---|
| | | preferred | more preferred | most preferred |
| b | x | 1-30 | 1-15 | 1.5-10 |
| c | y | 30-400 | 40-200 | 40-200 |
| d | z | 0-80 | 1-80 | 2-30 |
| e | u | 0-300 | 1-300 | 2-200 |
| f | v | <y | 0-30 (<y/3) | 0-15 (<y/5) |

The water content (u) can vary within wide limits and in theory it is possible to remove the water completely by distillation giving u=0. In practice it is difficult to remove the last traces of water from the polymer; also it is possible to add water in the form of a further amount of W/O emulsion or aqueous polymer solution; so that the water content of the composition can be high. As it is not economically feasible to remove all the water, u can preferably be 5-300, more preferably 10-200.

Preferred compositions contain, for 100 parts by weight of a), 1-30 parts b), 30-400 parts c), 1-80 parts d), 0-300 parts e) and 0-30 parts f) where the weight of f) is less than ⅓ that of c).

Particularly preferred compositions are those in which the weight of each component present is within the range given in the "most preferred" column of Table II.

The oil-containing compositions according to the invention are dispersions which may show a wide range of viscosities. The Brookfield rotation viscosity (measured in an LV-viscometer) may vary between 5 cp (spindle no. 2) and 10,000 cp (spindle no. 4), preferably between 50 cp (spindle no. 2) and 5000 cp (spindle no. 4). The dispersions are stable and can be stored for long periods of time without change or, if separation into two layers occurs, can be restored to the original form by simple stirring. The compositions of the invention, particularly those containing the oil c) have particularly good dispersability in water and can rapidly be diluted with water by stirring or by the use of conventional dilution apparatus.

In a preferred method of dilution, the dispersion is pumped through a nozzle into a stream of water which surrounds the nozzle. The water stream has a higher velocity than that of the stream of dispersion, and this velocity is sufficient to overcome at least partially the internal adhesive and cohesive forces in the dispersion, but not sufficient to reduce the size of the polymer molecules. The mixture of product and water is then alternatively accelerated in narrow tubes and decelerated in wider mixing zones until the desired degree of mixing is obtained. No sieves or filters are used in this process from the time the streams of water and of dispersion contact each other.

A mixing apparatus suitable for carrying out the above process comprises at least two cylindrical mixing chambers connected by rigid or flexible tubing of diameter not greater than half that of each mixing chamber. The first chamber is furnished with a coaxially mounted tube for the inflow of a stream of water and a second tube, substantially at right angles to the first, ending in a jet situated between the axis and circumference of the first tube and just beyond the end of the first tube. Means are provided for pumping the dispersion through this second tube. Near the other end of the mixing chamber is an exit tube leading to the second mixing chamber. The second and any subsequent mixing chambers are each provided with an inlet and an exit tube, preferably set into the side walls one near each end of the chamber. Finally an exit tube from the last mixing chamber leads to the apparatus in which the dilute aqueous dispersion of the composition according to the invention is to be used.

A particularly preferred apparatus is illustrated by way of example in FIGS. 1 and 2.

FIG. 1 is a vertical elevation of a six-chamber mixing apparatus, the upper chamber 1 being shown in cross section.

FIG. 2 is a horizontal cross-section along XX' of FIG. 1.

The chambers 1-6 are mounted alternately on opposite sides of a frame 7 and secured with clips 8. The chambers are constructed of cylindrical tubing 9 closed with screw caps 10 which can be removed for cleaning. In chamber 1 the tubing 9 is of transparent material to allow direct observation of the mixing process, in the other chambers it is of metal.

Chamber 1 is fitted with a coaxial water inlet tube 11, at right angles to which is mounted a dispersion inlet tube 12 which ends in a six-holed jet 13 positioned so as to be completely within the stream of water delivered by tube 11. In the cylindrical tubing 9, near the end remote from tube 11 is an opening 14 leading to a flexible hose 15 which connects to a similar opening in the side wall of chamber 2. From a second opening in chamber 2 a further hose 16 leads to chamber 3. Chambers 2–6 are all identical in construction and are connected, each to the next, by hoses 16–19. Finally, chamber 6 is provided with a flexible delivery hose 20.

In operation, a stream of water is led through tube 11 into chamber 1, and is allowed to run until all chambers are filled and the water is delivered from hose 20. The Reynolds number of the water flow at the exit of tube 11 is preferably between 25,000 and 75,000, and the pressure drop across the apparatus will for a medium size apparatus of total volume 1–100 liter preferably be from 0.5 to 2.5 bar, more preferably from 0.6 to 1.5 bar.

The dispersion is then pumped through tube 12 at a rate sufficient to give the desired concentration of product. The dispersion passes through the jet 13, the size and number of whose holes may be varied according to the viscosity of the dispersion, and is rapidly mixed in the stream of water from tube 11. The mixture passes from chamber 1 through the narrow hose 15 in which its flow is accelerated, and then into the wide chamber 2 in which its flow is again slowed down. The alternating acceleration and slowing of the flow in the successive connecting hoses and mixing chambers provides a complete mixing of the dispersion in the water, and the water containing the product is delivered through hose 20 to the apparatus in which it is to be used.

The compositions according to the invention can be very rapidly diluted with water and thus are suitable for use in many large-scale continuous processes, in which cationic polymers are used. By the use of the mixer described above, fully diluted solutions or dispersions can be obtained without the use of any dwell tanks; the mixer may simply be connected up to the equipment in which the diluted product will be used.

The compositions may contain very high concentrations of cationic polymer, enabling the minimum handling of bulk liquids.

Not only the concentrated compositions described above, but also partially diluted compositions containing at least 0.001% by weight of polymer a), more preferably at least 0.1% by weight of a) are included within the scope of the present invention. The partially diluted compositions may be further diluted as required before use.

The compositions of the invention are useful as flocculating agents, particularly as retention and dewatering agents in paper-making and as flocculating agents for aqueous sludge, particularly crude and treated sludge from sewage purification works. They may also be used in other processes where cationic polymers are employed, for example flotation of minerals or recovery of oil waste.

In paper making, the use of the compositions according to the invention can give a particularly homogeneous sheet formation. The compositions also show good biodegradability.

The following Examples illustrate the invention: all parts and percentages are by weight unless otherwise stated.

EXAMPLES

Emulsifiers used:

$B_1$ sodium salt of petroleum monosulphonate, MW 440–470 (62% solution in mineral oil)

$B_2$ sodium salt of petroleum monosulphonate, MW 480 (60% solution in mineral oil)

$B_3$ sodium salt of secondary n-alkane sulphonate, obtained from sulphoxidation of paraffin. The alkyl group has the following average composition: $C_{13-15}$ 58%, $C_{16-17}$ 39%, $>C_{17}<3\%$, $<C_{13}<1\%$ $D_1$ $C_{12}H_{25}(OCH_2CH_2)_2OH$, HLB 6.5

$D_2$ $C_{18}H_{35}(OCH_2CH_2)_3OH$, HLB 6.5

$D_3$ sorbitol monooleate, HLB 4.0

$D_4$ 1:1 molar mixture of mono- and di-oleates of $H(OCH_2CH_2)_{6.5}OH$, HLB 7.0 (average value)

Oils used:

$C_1$ white spirit: aromatic-free, b.p. 193°–247° C., mean MW 173

$C_2$ white spirit: low-aromatic, b.p. 190°–250° C. mean MW 180, aromatic content 0.5%

$C_3$ mineral oil: partially unsaturated mineral oil with following properties: specific gravity (SG) 0.85–0.95 aniline point 70°–80° C., iodine number 20–30

$C_4$ petrolatum: solidification point 50°–85° C. cone penetration 160–180 at 25° C.

$C_5$ olive oil:

$C_6$ isoparaffin: b.p. 210°–260° C., aniline point 88° C. isoparaffin content 80%, SG 0.78

$C_7$ mixture of methyl esters of $C_{12-20}$fatty acids SG 0.87–0.90, acid number 1.12, saponification number 190–200, iodine number 100–110, hydroxy number 40–60

$C_8$ mineral oil: SG 0.85–0.95, aniline point 95° C., viscosity (20° C.) 30 cp

Solvents used:

$F_1$ triisobutyl phosphate (50% in isobutanol)

$F_2$ 2 ethylhexanol $F_3$ tri(butoxyethyl)phosphate $F_4$ 2,4,7,9-tetramethyl-6-decyn-4,7-diol $F_5$ Pluronic L101 10:90 EO/PO copolymer, MW 3610

EXAMPLE 1

43.5 Parts emulsifier $B_1$ are mixed with 800 parts water, giving a fine opalescent emulsion. On addition of 8.2 parts calcium chloride, a precipitate of the water-insoluble calcium salt of $B_1$ is formed. Finally 440 parts white spirit $C_1$ is added with stirring, giving a water-in-oil emulsion which is stabilised by addition of 99.5 parts emulsifier $D_1$. To this emulsion is added in the following order 353 parts of 75% aqueous methacryloyloxyethyltrimethylammonium chloride, 454 parts acrylamide, 1.4 parts EDTA sodium salt, 0.7 parts ferric sulphate and 0.7 parts t-butylhydroperoxide, after which the pH of the aqueous phase is 3.0. The emulsion is heated to 35° C. under nitrogen, and an air-free solution of 2.7 parts sodium thiosulphate in 50 parts water is added dropwise over 8 hours, the temperature being kept at 35°–40° C. by cooling.

Polymerisation is complete when all the thiosulphate solution has been added. A stable, fine dispersion of polymer is obtained, of Brookfield viscosity 1000 cp (spindle 3, 60 rpm). The product is very easily diluted with water, the maximum viscosity of a 0.5% aqueous dilution with cold water being reached after only 30–40 seconds. The viscosity of a freshly-prepared 1% aqueous dilution is approx. 500 cp (Brookfield 3, 60 rpm).

EXAMPLE 2

454 Parts acrylamide, 353 parts of 75% aqueous methacryloyloxyethyltrimethylammonium chloride, 1.4 parts disodium EDTA, 0.7 parts ferric sulphate and 9.8 parts calcium chloride are added in the stated order to 600 parts water. The solution so obtained is then mixed with a solution of 52 parts emulsifier $B_1$ and 80 parts emulsifier $D_1$ in 600 parts white spirit $C_1$, giving a water-in-oil emulsion whose aqueous phase has a pH of 3.0. Under a nitrogen atmosphere is added first 0.7 parts t-butylhydroperoxide and then an air-free solution of 1.1 parts sodium thiosulphate in 12 parts water. A strongly exothermic reaction sets in, giving a temperature rise of up to 90° C. even under light cooling. On cooling, a fine dispersion of polymer is obtained, which is easily diluted with water.

EXAMPLE 3

24 Parts emulsifier $B_1$ is mixed with 480 parts of water, giving a fine opalescent emulsion. To this is added 564 parts of 75% aqueous methacryloyloxyethyltrimethylammonium chloride, whereby the surfactant salt of the cationic monomer is formed. The following components are then in the stated order, with stirring; 408.3 parts acrylamide, 1.43 parts disodium EDTA, 0.77 parts ferric sulphate, 480 parts white spirit $C_1$, 30 parts emulsifier $D_1$, 30 parts emulsifier $D_2$, 4.8 parts calcium chloride and 0.6 parts t-butylhydroperoxide.

The resulting dispersing is purged with nitrogen and warmed to 30° C., then an air-free solution of 2.97 parts sodium thiosulphate in 42 parts water is added over 8 hours, the temperature rising to 50° C. A fine dispersion of polymer is obtained, which is easily diluted with water.

EXAMPLE 4

500 parts of the product of Example 1 is stirred with 10 parts white spirit $C_1$ and 10 parts emulsifier $B_2$ and then distilled with a Dean-Starke apparatus at 26 mbar, 40° C. until approx. 200 parts water has been removed. A fine, stable polymer dispersion is obtained, which in spite of its low water content is readily diluted with water.

EXAMPLE 5

The procedure of Example 1 is repeated and to the product is added 10% of the total weight of the product of Example 3.1 of U.S. Pat. No. 3,632,559, containing 20% wt. cationic polymer and 80% water. A stable W/O emulsion is obtained.

EXAMPLE 6 i) Preparation of polymer dispersion without surfactant b

454 Parts acrylamide and 353 parts 75% aqueous methacryloyloxyethyltrimethylammonium chloride are dissolved in 800 parts water, and 1.43 parts disodium EDTA and 0.72 parts ferric sulphate are added. The pH is adjusted to 3.0 with approx. 0.1 part 30% caustic soda, then a solution of 143 parts emulsifier $D_1$ in 440 parts white spirit $C_2$ is added with vigorous stirring. A milky W/O emulsion is formed, which is thoroughly de-aerated and stirred while bubbling a stream of nitrogen through the mixture.

After addition of 0.67 parts t-butyl hydroperoxide, the mixture is heated to 35° C., and a solution of 2.7 parts sodium thiosulphate in 50 parts water is added dropwise over 5 hours, the temperature being held at 36°-38° C. by cooling. After addition is complete, reaction is continued for 2 hours at 35° C., and the product is then cooled to room temperature.

ii) Addition of surfactant b

A 20% aqueous emulsion of $B_1$ (sodium petroleum sulphonate) is treated with excess $CaCl_2$, and the precipitated calcium salt collected by filtration, dried under vacuum at 60°-70° C. and taken up in mineral oil to give a 30% solution. 20 Parts of this solution and 20 parts white spirit $C_2$ are added to 200 parts of the suspension prepared in i) above. A viscous product is obtained which in spite its high viscosity may be rapidly diluted with water.

EXAMPLE 7

The calcium salt of emulsifier $B_3$ is prepared as described above for $B_1$, and 10 parts of this salt are dissolved in a mixture of 80 parts white spirit $C_2$ and 30 parts mineral oil $C_3$. 25 Parts of this solution are added to 200 parts of the suspension prepared in Example 6 i). The resulting mixture is readily diluted with water.

EXAMPLE 8

To 200 parts of the suspension prepared in Example 6 i) are added 30 parts of a solution containing 14.3% sodium petroleum sulphonate $B_2$, 57.0% mineral oil $C_3$ and 28.6% of a 50% solution of triisobutyl phosphate in isobutanol ($F_1$). A viscous product is obtained, which is readily diluted on addition to water.

EXAMPLE 9

To 2210 parts of the polymer emulsion prepared in Example 1 are added 330 parts mineral oil $C_3$ and 330 parts petrolatum $C_4$, and the mixture is evacuated to 26 mbar under stirring and heated to 40° C. over ca. 6 hours, collecting 860 parts water in a Dean-Stark trap, any oil which distilled being returned to the distillation mixture. A very fine, stable, slightly viscous dispersion is obtained, which may be diluted with water approximately as readily as the product of Example 1.

EXAMPLE 10

A dispersion containing 960 parts water, 816.6 parts acrylamide, 1128 parts 75% aqueous methacryloyloxyethyltrimethylammonium chloride, 2.9 parts disodium EDTA, 1.5 parts ferric sulphate, 9.1 parts calcium chloride, 48 parts emulsifier $B_1$, 60 parts emulsifier $D_1$, 60 parts emulsifier $D_2$ and 960 parts white spirit $C_1$ is adjusted to pH 3.0 and 1.2 parts t-butylhydroperoxide are added. Polymerisation is carried out under nitrogen by adding 6.5 parts sodium thiosulphate in 20 parts water over 8 hours, the temperature rising to approx. 48° C. in spite of cooling.

To the product are added 165.7 parts mineral oil $C_3$, and 27.7 parts emulsifier $D_3$, and 1186 parts water is distilled off at 20-26 mbar, 50° C. The resulting fine mobile dispersion is mixed with 157.5 parts olive oil $C_5$ and 157.5 parts 2-ethylhexanol ($F_2$). The product is practically instantaneously diluted in water.

EXAMPLE 11-13

Example 10 is repeated, with $F_2$ replaced by equal quantities of $F_1$, $F_3$ and $F_4$, respectively.

EXAMPLE 14

43.5 Parts emulsifier $B_1$ are mixed with 834 parts water to give a very fine opalescent emulsion. In order to form the calcium salt of $B_1$, 8.2 parts calcium chloride are added. The following components are then added with stirring: 557 parts acrylamide, 216 parts 75% aqueous methacryloyloxyethyltrimethylammonium chloride, 1.4 parts disodium EDTA, and 0.7 parts ferric sulphate, giving a cloudy solution, to which are added 400 parts isoparaffin $C_6$, 40 parts mineral oil $C_3$, 100 parts emulsifier $D_1$ and 13 parts emulsifier $B_2$, to give a W/O emulsion which is polymerised under nitrogen by the addition of 0.7 parts t-butyl hydroperoxide than 6 parts of a solution of 2.7 parts sodium thiosulphate in 50 parts water. The temperature rises to 85° C., even with cooling. The resulting dispersion may be rapidly diluted with water.

EXAMPLE 15

Example 14 is repeated with the following changes:
709 Parts water, 183.3 parts acrylamide and 714 parts of the aqueous cationic monomer are used; the temperature rises to approx. 43° C. under adiabatic conditions; and after the polymerisation 33 parts Pluronic L101 ($F_5$) and 165 parts fatty acid esters $C_7$ are added.

EXAMPLE 16

Example 14 is repeated with the following changes:
160 Parts mineral oil $C_8$ are used in place of 40 parts $C_3$; and the temperature is kept between 35 and 40° C.

EXAMPLE 17

43.5 Parts emulsifier $B_1$ are mixed with 800 parts water, and to the resulting emulsion are added 8.8 parts calcium chloride, 363 parts acrylamide, 124 parts diallylamine, 353 parts 75% aqueous methacryloyloxyethyltrimethylammonium chloride, 131 parts 34% hydrochloric acid to adjust the pH to 3.0, 1.4 parts disodium EDTA, and 0.7 parts ferric sulphate. A homogeneous monomer solution is formed, to which is added 400 parts white spirit $C_1$, 40 parts mineral oil $C_3$ and 100 parts emulsifier $D_1$. A fine emulsion is formed, which is polymerised under nitrogen by the addition of 0.7 parts t-butylhydroperoxide followed by 16 parts of a solution of 2.7 parts sodium thiosulphate in 50 parts water. The temperature during polymerisation rises under adiabatic conditions to 65° C.

EXAMPLE 18

Example 2 is repeated with the following changes:
29 Parts emulsifier $B_1$ are used; and the 80 parts emulsifier $D_1$ are replaced by a mixture of 49 parts $D_3$ and 65 parts $D_4$.

EXAMPLE 19

Example 17 is repeated with the following changes:
454 Parts acrylamide replace 363 parts acrylamide + 124 parts diallylamine; no HCL is used; 54 parts $B_2$ replace 100 parts $D_1$; 45 parts thiosulphate solution replaces 16 parts; and the temperature rises within 90 minutes to 90° C.

EXAMPLE 20

43.5 Parts emulsifier $B_1$ is mixed with 600 parts water. To this is added 8.2 parts calcium chloride, 454 parts acrylamide, 1.4 parts disodium EDTA, 0.7 parts ferric sulphate, 400 parts white spirit $C_1$, 40 parts mineral oil $C_3$, 100 parts emulsifier $D_1$ and 13 parts emulsifier $B_2$. A water-in-oil emulsion is formed which is polymerised under nitrogen by adding 0.7 parts t-butyl hydroperoxide and 1 part of a solution of 2.7 parts sodium thiosulphate in 50 parts water. The polymerisation reaction is held at a temperature of 60° C. When the temperature begins to fall off, a solution of 265 parts methacryloyloxyethyltrimethylammonium chloride in 288 parts water is added dropwise, giving a further rise of temperature, which is held at 55°-60° C. by cooling. After the addition is complete, the product is stirred 1 hour at 55° C. then cooled to room temperature.

EXAMPLE 21

Example 15 is repeated with the following changes:
11 parts $B_1$ are used in place of 43.5 parts; 25 parts $D_1$ are used in place of 100 parts; 3.25 parts $B_2$ are used in place of 13 parts; and no $F_5$ and $C_7$ are added after polymerisation.

EXAMPLE 22

Example 16 is repeated with the following changes:
21.75 parts $B_1$ are used in place of 43.5 parts
50.00 parts $D_1$ are used in place of 100 parts
6.50 parts $B_2$ are used in place of 13 parts.

DILUTION EXAMPLE

A mixing apparatus as shown in FIG. 1 is used, having 6 chambers each of inner diameter 11 cm and volume 2.5 l. The connecting hoses have an inner diameter of 15 mm and are each 40 cm long.

Into the first chamber of the mixture is fed through a 15 mm diam. jet a stream of water of 2000 l/hour, giving a speed of 3.2 m/sec. at the jet (Reynolds number 47000). Into the water stream is fed, by means of a pump operating at a frequency of 50 Hz, 5 l/hr of the product of Example 1. The polymer jet has six holes of 1 mm diameter, and is equipped with a non-return valve.

The diluted product delivered from the mixer is a ready-to-use aqueous solution of the product suitable for use in paper making.

APPLICATION EXAMPLE A

A 2% aqueous paper slurry of the following composition is prepared; 100 parts bleached sulphite pulp, 20 parts kaolin, 3 parts resin size, 2 parts aluminium sulphate.

Four samples (250 ml) of this slurry are mixed with 5, 10, 15 and 20 ml respectively of a 0.0125% aqueous stock dilution of the product of Example 1 and 750 ml water. After stirring 5 sec. at 250 rpm, each mixture is poured into 3 l of water in the filling chamber of a Rapid-Köthen sheet former, and after a 20 sec. pause the suction valve is operated to form the sheet. After drying and conditioning the paper sheet is incinerated and the ash content measured and calculated as a percentage of the weight of filler which was used, giving the % retention. The results are given in Table A.

TABLE A

| amount of stock dilution added | concentration of polymer emulsion based on dry paper weight (%) | % ash | % retention (average of 2 measurements) |
| --- | --- | --- | --- |
| 0 | — | 8.51 | 51.1 |
| 5 | 0.0125 | 13.31 | 79.9 |
| 10 | 0.025 | 14.34 | 86.0 |
| 15 | 0.0375 | 14.66 | 88.0 |
| 20 | 0.05 | 14.73 | 88.4 |

APPLICATION EXAMPLE B

200 Parts of a sewage suspension of 5% dry solids content are treated with W parts of a 0.23% aqueous stock dilution of the product of Example 1, stirred 10 sec. in a 'Triton' stirrer at 1000 rpm, then immediately filtered through a cloth filter. For each sample, the volume of filtrate after 30, 60, 90, 120 and 180 seconds is measured, and the mean value of these is calculated. The results are shown in Table B.

TABLE B

| W (parts by weight) | mean filtrate volume (parts by volume) |
|---|---|
| 0 | 1.5 |
| 13 | 15.3 |
| 15 | 40.4 |
| 17 | 49.1 |
| 19 | 81.9 |

The products of Examples 2-22 may be used in analogous manner to Application Examples A and B.

What is claimed is:

1. A water-miscible composition comprising
   a) a hydrophilic cationic polymer free of anionic monomer components and comprising at least 70% by weight of vinyl addition polymers of cationic or both cationic and non-ionic vinyl monomers, and
   b) a sulphonated hydrocarbon surfactant, the molar quantity of b) being not greater than the molar quantity of the cationic monomer units of a), and the amount of b) being at least 0.5%, by weight, based on the weight of a).

2. A composition according to claim 1 wherein component b) contains at least one lipophilic hydrocarbon residue of at least 9 carbon atoms and at least one hydrophilic anionic group.

3. A composition according to claim 1 wherein component b) is in the form of a salt of a polyvalent inorganic cation.

4. A composition according to claim 1 wherein component a) consists entirely of vinyl addition polymers of cationic or both cationic and non-ionic vinyl monomers.

5. A composition according to claim 2 wherein component b) is in the form of a salt of a polyvalent inorganic cation.

6. A composition according to claim 3 wherein the cation is $Ca^{++}$.

7. A composition according to claim 5 containing in addition to a) and b)
   c) a water-immiscible oil in which the polymer a) is insoluble.

8. A composition according to claim 5 wherein b) is a petroleum sulphonate.

9. A composition according to claim 5 wherein b) is an alkylsulphonate, an olefin sulphonate or an alkarylsulphonate.

10. A composition according to claim 5 wherein polymer a) and its salts with b) are such as can form true or colloidal solutions in water.

11. A composition according to claim 5 wherein the cationic vinyl monomers are selected from those of formulae I to VIII

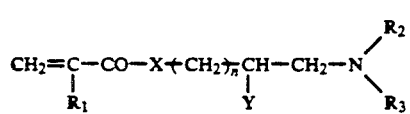

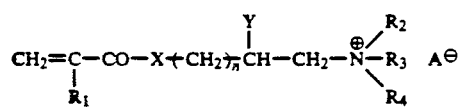

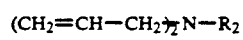

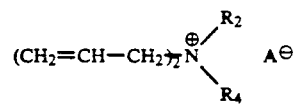

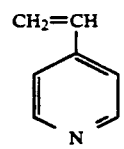

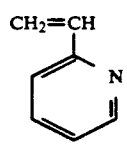

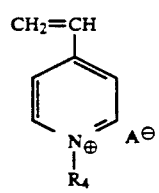

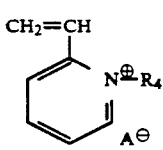

wherein
$R_1$ is H or methyl,
$R_2$ is methyl or ethyl,
$R_3$ is methyl or ethyl,
$R_4$ is hydrogen, methyl or ethyl,
X is —O— or —NH—,
Y is H or —OH when X is —O— and H when X is —NH—,
n is 0 or 1, provided that when Y is —OH, n=1, and $A^\ominus$ is an anion.

12. A composition according to claim 7 in which the oil c) is selected from low-aromatic hydrocarbons and aliphatic fatty acid esters.

13. A composition according to claim 7 comprising, in addition to a), b) and c),
   d) a lipophilic non-ionic surfactant which is capable of functioning as a water-in-oil emulsifier.

14. A composition according to claim 7 containing, in addition to components a), b) and c),
   e) water.

15. A composition according to claim 7 containing, in addition to components a), b) and c),
   f) an oil-miscible polar solvent which is only slightly soluble in water, not self-dispersing in water, and which has no emulsifying properties of its own, but which reduces the water/oil interfacial surface tension.

16. A composition according to claim 11 wherein the cationic vinyl monomers are selected from those of formulae I and II.

17. A composition according to claim 15, in which component f) is selected from $C_{5-10}$ aliphatic alcohols and phosphoric acid triesters.

18. A composition according to claim 16 wherein component b) is a petroleum sulphonate.

19. A composition according to claim 16 wherein, in the compounds of formula I and II, Y is hydrogen and X is —O—.

20. A composition according to claim 16 wherein the cationic vinyl monomer is of the formula $$CH_2=C(CH_3)-C(=O)-OCH_2CH_2N^{\oplus}(CH_3)_3 \; A^{\ominus}$$

21. A composition according to claim 16 wherein component a) is entirely composed of vinyl addition polymers of cationic or both cationic and non-ionic monomers.

22. A composition according to claim 16 wherein, in component b), the polyvalent inorganic cation is $Ca^{++}$.

23. A composition according to claim 16 wherein a) is a copolymer of a compound of formula I or II wherein Y is hydrogen and X is O with methacrylamide, acrylamide or a mixture thereof.

24. A composition according to claim 18 wherein the cationic vinyl monomer is of the formula $$CH_2=C(CH_3)-C(=O)-OCH_2CH_2N^{\oplus}(CH_3)_3 \; A^{\ominus}$$

25. A composition according to claim 18 containing 1 to 30 parts, by weight, of b) per 100 parts, by weight, of a).

26. A composition according to claim 19 wherein component a) is a copolymer of the cationic monomer with methacrylamide, acrylamide or a mixture thereof.

27. A composition according to claim 23 wherein in component a), the molar quantity of cationic monomer units is at least 5% of the total.

28. A composition according to claim 25 wherein polymer a) and its salts with b) are such as can form true or colloidal solutions in water.

29. A water miscible composition comprising
a) a hydrophilic cationic polymer free from anionic monomer components and comprising at least 70% by the weight of vinyl addition polymers of cationic or both cationic and non-ionic vinyl monomers,
b) an anionic surfactant containing at least one lipophilic hydrocarbon residue of at least 9 carbon atoms and at least one hydrophilic anionic group,
c) a water-immiscible oil in which the polymer a) is insoluble, and
d) a lipophilic non-ionic surfactant which is capable of functioning as a water-in-oil emulsifier, with the provisos that: 1) polymer a) is a polymer prepared by polymerization of its corresponding monomers in the presence of at least part of the anionic surfactant b), 2) the molar quantity of b) is not greater than the molar quantity of the cationic monomer units of a), and 3) said composition contains, per 100 parts by weight of a), 1-30 parts b), 30-400 parts c) and 1-80 parts d).

30. A composition according to claim 29 wherein component b) is in the form of a salt of a polyvalent inorganic cation.

31. A composition according to claim 30 wherein component b) is selected from sulphated fatty acid mono-, di- and tri-glycerides, sulphated fatty alcohols; sulphated fatty alkanolamides; sulphonated hydrocarbons; sulphonated aliphatic carboxylic acids and esters; partial alkyl esters of phosphoric acid; aliphatic carboxylic acids; and carboxymethylation products of fatty alcohols; monoglycerides and fatty acid alkanolamides.

32. A composition according to claim 30 wherein component c) is selected from low-aromatic hydrocarbons and aliphatic fatty acid esters.

33. A composition according to claim 30 wherein the cationic vinyl monomers are selected from those of formulae I to VIII $$CH_2=C(R_1)-CO-X-(CH_2)_n-CH(Y)-CH_2-N(R_2)(R_3) \quad \text{I}$$

$$CH_2=C(R_1)-CO-X-(CH_2)_n-CH(Y)-CH_2-N^{\oplus}(R_2)(R_3)(R_4) \; A^{\ominus} \quad \text{II}$$

$$(CH_2=CH-CH_2)_2N-R_2 \quad \text{III}$$

$$(CH_2=CH-CH_2)_2N^{\oplus}(R_2)(R_4) \; A^{\ominus} \quad \text{IV}$$

V: 4-vinylpyridine

VI: 2-vinylpyridine

VII: N-substituted 4-vinylpyridinium ($N^{\oplus}-R_4$, $A^{\ominus}$)

VIII: vinyl-substituted piperidinium ($N^{\oplus}-R_4$, $A^{\ominus}$)

wherein
$R_1$ is H or methyl,
$R_2$ is methyl or ethyl,
$R_3$ is methyl or ethyl,
$R_4$ is hydrogen, methyl or ethyl,
X is —O— or —NH—, Y is H or —OH when X is —O— and H when X is —NH—, n is 0 or 1, provided that when Y is —OH, n=1 and A⊖ is an anion.

34. A composition according to claim 31 wherein component c) is selected from low-aromatic hydrocarbons and aliphatic fatty acid esters.

35. A composition according to claim 33 wherein the cationic vinyl monomers are selected from those of formulae I and II.

36. A composition according to claim 33 wherein A⊖ is $A_1⊖$ where $A_1⊖$ is the anion of the anionic surfactant b).

37. A composition according to claim 34 in which d) is either i) one or more compounds having at least one lipophilic hydrocarbon residue of at least 9 carbon atoms and at least one non-ionic hydrophilic residue, which is either a mono- or polyethylene glycol group, and which may also contain propylene glycol units, or the residue of a polyol or ii) one or more hydrophobic ethylene oxide/propylene oxide copolymers and addition products of ethylene oxide and propylene oxide to ethylene diamine having a high propylene oxide content.

38. A composition according to claim 35 wherein component b) is a petroleum sulphonate.

39. A composition according to claim 36 in which component b) is selected from sulphated fatty acid mono-, di- and tri-glycerides; sulphated fatty alcohols; sulphated fatty alkanolamides; sulphonated hydrocarbons; sulphonated aliphatic carboxylic acids and esters; partial alkyl esters of phosphoric acid; aliphatic carboxylic acids; and carboxymethylation products of fatty alcohols, monoglycerides and fatty acid alkanolamides.

40. A composition according to claim 38 wherein component a) is an addition polymer of methacryloyloxyethyltrimethylammonium chloride and acrylamide.

41. A composition according to claim 38 wherein component c) is an aromatic-free or low-aromatic white spirits, isoparaffin or paraffin oil.

42. A composition according to claim 38 wherein component d) is a compound of formula X-XIII

  X

-continued

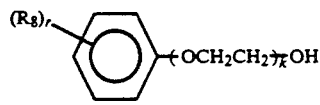  XI $R_{10}$—CO—Q  XII $R_{10}$—CO—O(CH$_2$CH$_2$O)$_m$COR$_{10}$  XIII in which
$R_8$ is $C_{4-12}$ alkyl
$R_9$ is $C_{9-18}$ alkyl or alkenyl
$R_{10}CO$ is the acyl residue of an aliphatic $C_{12-18}$ fatty acid
Q is the monovalent residue of sorbitol, glycerol, or di- to tetra-ethylene glycol
t is 2-3
r is 1 or 2
k is 3-5 and
m is 4-9.

43. A composition according to claim 40 wherein component c) is white spirit and component d) is a compound of formula $C_{12}H_{25}(OCH_2CH_2)_2OH$.

44. A composition according to claim 43 which further comprises f) a 10:90 ethylene oxide:propylene oxide copolymer having a molecular weight of 3610.

45. A composition according to claim 7 wherein component a) is finely dispersed in component c).

46. A composition according to claim 12 wherein component a) is finely dispersed in component c).

47. A composition according to claim 14 wherein components a) and e) are finely dispersed in component c).

48. A composition according to claim 29 wherein component a) is finely dispersed in component c).

49. A composition according to claim 29 which further comprises e) water and wherein components a) and e) are finely dispersed in component c).

50. A composition according to claim 37 wherein component a) is finely dispersed in component c).

51. A composition according to claim 31 which further comprises e) water and wherein components a) and e) are finely dispersed in component c).

52. A composition according to claim 41 wherein component a) is finely dispersed in component c).

53. A composition according to claim 41 which further comprises e) water and wherein components a) and e) are finely dispersed in component c).

* * * * *